United States Patent
Kang (10) Patent No.: US 10,288,920 B2
(45) Date of Patent: May 14, 2019

(54) LIQUID CRYSTAL DISPLAY

(71) Applicant: LG DISPLAY CO., LTD., Seoul (KR)

(72) Inventor: ChangGong Kang, Incheon (KR)

(73) Assignee: LG DISPLAY CO., LTD., Seoul (KR)

(*) Notice: Subject to any disclaimer, the term of this patent is extended or adjusted under 35 U.S.C. 154(b) by 133 days.

(21) Appl. No.: 15/292,270

(22) Filed: Oct. 13, 2016

(65) Prior Publication Data

US 2017/0184909 A1 Jun. 29, 2017

(30) Foreign Application Priority Data

Dec. 28, 2015 (KR) .................. 10-2015-0187171

(51) Int. Cl.
*G02F 1/1333* (2006.01)

(52) U.S. Cl.
CPC ............ *G02F 1/133308* (2013.01); *G02F 2001/133311* (2013.01); *G02F 2001/133322* (2013.01); *G02F 2202/28* (2013.01)

(58) Field of Classification Search
CPC ......... G02F 1/133308; G02F 1/133608; G02F 2001/133311; G02F 2001/133322; G02F 2202/28

USPC ............................................. 349/58
See application file for complete search history.

(56) References Cited

U.S. PATENT DOCUMENTS

| 6,175,396 B1* | 1/2001 | Kim .................. G02F 1/133308 349/58 |
| 2013/0249846 A1* | 9/2013 | Ikeguchi ............... G06F 1/1601 345/173 |
| 2013/0300975 A1* | 11/2013 | Suzuki ................. H05K 5/0017 349/58 |

* cited by examiner

*Primary Examiner* — Nathanael R Briggs
*Assistant Examiner* — William D Peterson
(74) *Attorney, Agent, or Firm* — Birch, Stewart, Kolasch & Birch, LLP (57) ABSTRACT

A liquid crystal display according to an embodiment includes a display panel, a functional panel on the display panel, a first support unit configured to support the functional panel, a light-emitting unit below the display panel, a second support unit configured to support the light-emitting unit and being attached to the first support unit, and a dual sealing tape configured to bind the first support unit and the second support unit together, and to seal a gap between the first support unit and the second support unit.

17 Claims, 6 Drawing Sheets

LIQUID CRYSTAL DISPLAY

CROSS-REFERENCE TO RELATED APPLICATIONS

This application claims the priority of Korean Patent Application No. 10-2015-0187171 filed on Dec. 28, 2015, in the Korean Intellectual Property Office, the disclosure of which is incorporated herein by reference.

BACKGROUND

Technical Field

The present disclosure relates to a liquid crystal display and more particularly, to a liquid crystal display including a dual sealing tape that seals a gap between a storage unit and a case.

Description of the Related Art

Recently, with the developments in various mobile electronic devices and large electronic devices such as a mobile phone, a personal digital assistant (PDA), a tablet personal computer (PC), and a laptop PC, various demands for display devices have been gradually increasing. The display device can be implemented in various manners such as a liquid crystal display (LCD), an organic light emitting display (OLED), etc.

The liquid crystal display is a display device including a liquid crystal layer. The liquid crystal display may be driven by adjusting a transmittance ratio of light from a light source such as a backlight unit. Recently, a demand for a liquid crystal display having a high resolution and low power consumption has been increasing. In this regard, various optical sheets have been used for the liquid crystal display to reduce power consumption while increasing a resolution.

SUMMARY

An aspect to be achieved by the present disclosure is to provide a liquid crystal display having a new configuration which includes a dual sealing tape for sealing a gap between a case and a storage unit when the case and the storage unit are joined together.

The aspects of the present disclosure are not limited to the aforementioned aspects, and other aspects, which are not mentioned above, will be apparent to a person having ordinary skill in the art from the following description.

According to an aspect of the present disclosure, there is provided a liquid crystal display. The liquid crystal display includes a display panel; a functional panel on the display panel; a first support unit configured to support the functional panel; a light-emitting unit below the display panel; a second support unit configured to support the light-emitting unit, the second support unit being joined to the first support unit; and a dual sealing tape configured to bind the first support unit and the second support unit together, and to seal a gap between the first support unit and the second support unit.

According to an aspect of the present disclosure, there is provided a liquid crystal display. The liquid crystal display includes a display unit; an optical unit below the display unit; a light source configured to supply light to the display unit through the optical unit; a storage unit configured to accommodate the optical unit and the light source; a fastening member configured to fasten the optical unit to the storage unit; a case configured to accommodate the display unit, the case being bound to the storage unit; and an adhesive member configured to minimize a particles from entering between the display unit and the optical unit by minimizing a gap between the storage unit and the case.

Details of other embodiments will be included in the detailed description of the disclosure and the accompanying drawings.

According to an aspect of the present disclosure, a liquid crystal display includes a dual sealing tape to seal a gap between a case and a storage unit, thereby suppressing a black dot defect or a bright dot defect due to entering particles.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the time order relation is described using the terms such as "after", "subsequent to", "next", and "before", the time order may be discontinuous unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The "X-axis direction", the "Y-axis direction, and the "Z-axis direction" should not be understood only in a geometric relationship in which the directions are orthogonal to one another, and may have a more comprehensive directional relationship within a range in which a configuration of the present disclosure can function.

The term "at least one" should be interpreted to include all combinations that can be proposed from at least one related item. For example, "at least one of a first item, a second item, and a third item" may refer to not only each of the first item, the second item, and the third item, but also a combination of all items that can be proposed from at least two of the first item, the second item, and the third item.

The features of various embodiments of the present disclosure can be partially or entirely bonded to or combined with each other and can be interlocked and operated in technically various ways, and the embodiments can be carried out independently of or in association with each other.

A liquid crystal display may include a display unit and a light-emitting unit. The light-emitting unit may supply light to the display unit, and the display unit may display an image. The display unit may be accommodated in a case, and the light-emitting unit may be accommodated in a storage unit. The light-emitting unit may use an optical sheet. The optical sheet may uniformly diffuse light from a light source and supply the diffused light to the display unit. The optical sheet may be included in the light-emitting unit. The optical sheet included in the light-emitting unit may be fastened to the storage unit.

The optical sheet may be fastened to the storage unit by a fastening member. The storage unit may be bent at a portion at which the optical sheet is fastened by the fastening member. The storage unit may be bent due to a characteristic of the storage unit or a fastening state, or due to environmental factors such as a high temperature, high humidity, long-term use, etc. Therefore, when the storage unit and the case are joined together, a gap may be generated between the storage unit and the case around the bent portion of the storage unit.

Particles may enter the gap between the storage unit and the case from outside. The entering particles may be positioned around the optical sheet. In particular, particles positioned on a surface of the optical sheet or between optical sheets may block light that passes through the optical sheet. Therefore, light may not be supplied to a portion of the display unit corresponding to a portion of the optical sheet in which particles are present. As a result, a black dot defect, in which a portion of the liquid crystal display looks black, may be generated.

Further, the particles positioned on the surface of the optical sheet or between the optical sheets may damage the optical sheet. In a damaged portion of the optical sheet, light is not uniformly diffused and may pass through the optical sheet. Therefore, an excessive amount of light may be supplied to a portion of the display unit corresponding to the damaged portion of the optical sheet. As a result, a bright dot defect, in which a portion of the liquid crystal display looks white, may be generated.

In view of the above problems recognized by the present inventor, an aspect of the present disclosure is to provide a method of protecting the optical sheet, thereby improving a problem that particles enters the liquid crystal display. Therefore, the inventor of the present disclosure has invented a liquid crystal display having a new configuration in which a gap between a case and a storage unit is sealed using an adhesive member to minimize particles from entering the liquid crystal display.

Hereinafter, preferred embodiments of the present disclosure will be described in detail with reference to accompanying drawings.

Figure 1:
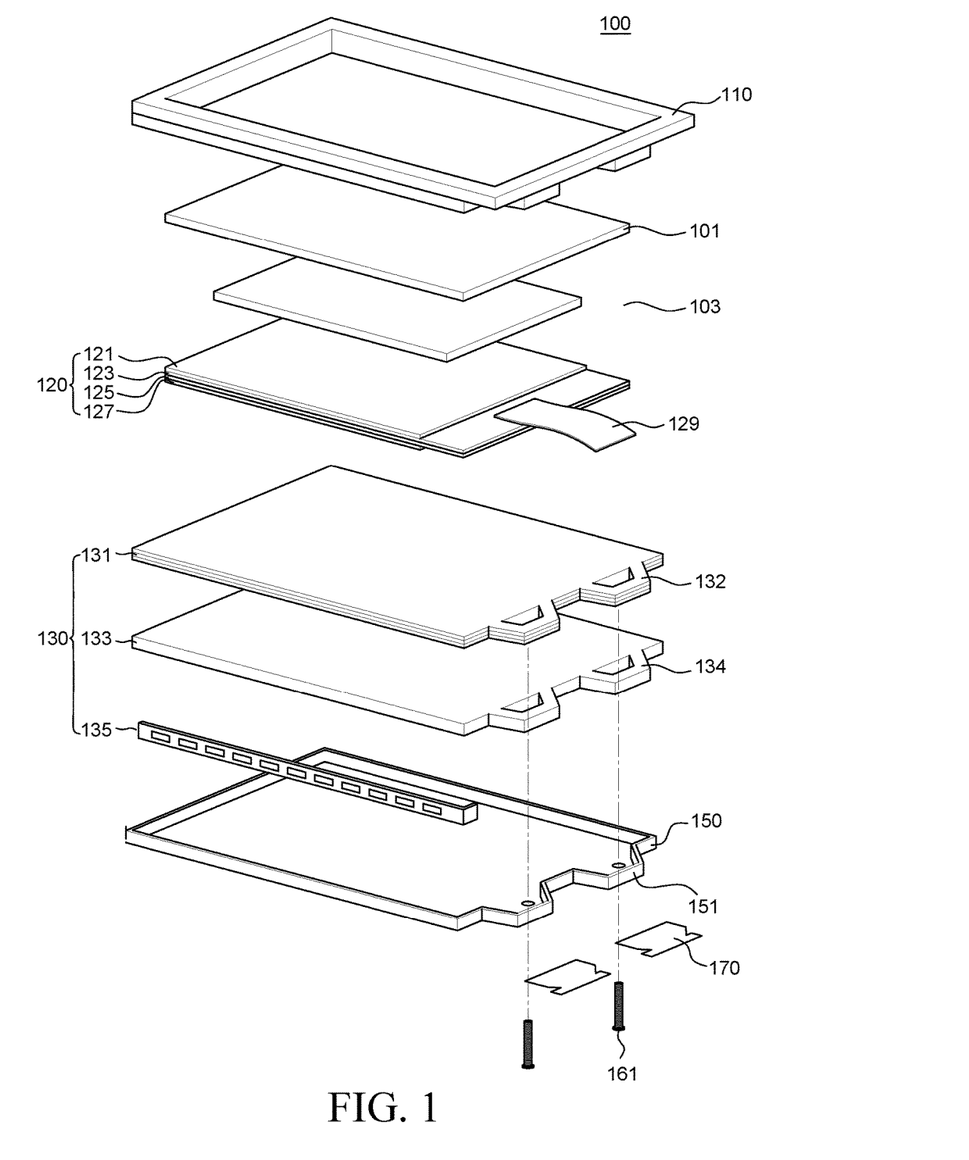
FIG. 1 is a perspective view of a liquid crystal display according to an embodiment of the present disclosure.
Figure 2:
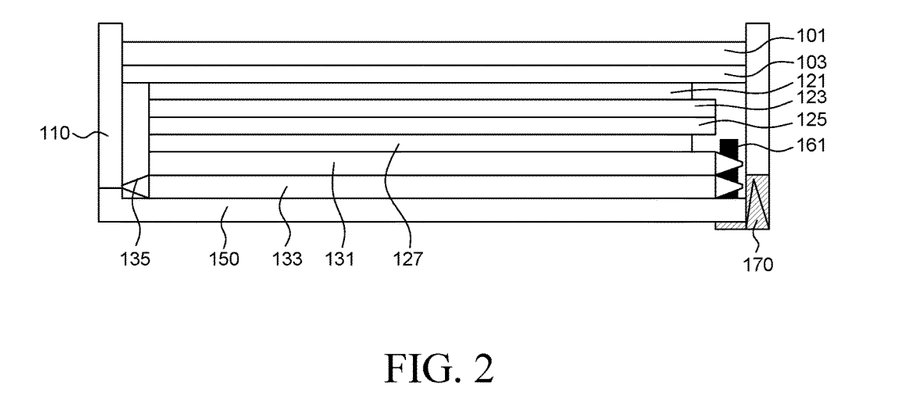
FIG. 2 is a cross-sectional view of the liquid crystal display according to the embodiment of the present disclosure.

FIG. 1 is a perspective view of a liquid crystal display 100 according to an embodiment of the present disclosure, and FIG. 2 is a cross-sectional view of the liquid crystal display according to the embodiment of the present disclosure. A configuration of the liquid crystal display 100 will be described with reference to the exploded perspective view and the cross-sectional view of the liquid crystal display 100. All the components of the liquid crystal display according to all embodiments of the present disclosure are operatively coupled and configured.

As illustrated in FIG. 1 and FIG. 2, the liquid crystal display 100 according to the embodiment of the present disclosure may include a case 110, a storage unit 150, a display unit 120, and a light-emitting unit 130.

A functional panel 101 may be positioned on the display unit 120. Examples of the functional panel 101 may include cover glass that minimizes damage to the display unit 120 by absorbing external impact, and a touch panel for inputting data with a touch of a finger of a person or a pen (a stylus pen, etc.). In addition, functional panels 101 having various functions may be applied.

An adhesive layer 103 may be positioned between the functional panel 101 and the display unit 120. The adhesive layer 103 may attach the functional panel 101 to the display unit 120. That is, the functional panel 101 and the display unit 120 may be bonded together by the adhesive layer 103.

The display unit (or display panel) 120 may include a thin film transistor (TFT) array substrate 125, a color filter layer 123, an external module 129, a liquid crystal layer, a first polarizing layer 121, and a second polarizing layer 127.

The color filter layer 123 may be positioned on the TFT array substrate 125. The external module 129 may be positioned on the TFT array substrate 125. In this instance, the external module 129 may be positioned on the same layer as the color filter layer 123. The liquid crystal layer may be disposed between the TFT array substrate 125 and the color filter layer 123. The second polarizing layer 127 may be positioned below the TFT array substrate 125. The first polarizing layer 121 may be positioned on the color filter layer 123.

The TFT array substrate 125 may include a plurality of gate lines and data lines which are vertically and horizontally disposed to define a plurality of pixel regions. A TFT as a switching element may be formed in each pixel region, and a pixel electrode may be formed on the pixel region. The TFT may include a gate electrode, a semiconductor layer, a source electrode, and a drain electrode. The gate electrode may be electrically connected to a gate line. The semiconductor layer may be formed on the gate electrode and may be made of stacked amorphous silicon. The source electrode and the drain electrode may be formed on the semiconductor layer and electrically connected to a data line and the pixel electrode, respectively. In this instance, the semiconductor layer is not restricted thereto, and may contain various materials such as an oxide semiconductor or organic semiconductor layer. The TFT array substrate 125 may have a shape of a rectangle, a square, or a circle. However, the disclosure is not limited thereto.

The external module 129 may be a flexible printed circuit board (FPCB). A controller such as an integrated circuit (IC) chip, a circuit unit, etc. may be installed in the external module 129. The external module 129 may transmit a signal for driving the TFT array substrate 125 from the controller to the TFT array substrate 125.

The color filter layer 123 may include a color filter and a black matrix. The color filter may include a plurality of sub-color filters that implement colors of red (R), green (G), and blue (B). The black matrix may divide the sub-color filters, and block light penetrating the liquid crystal layer.

The first polarizing layer 121 and the second polarizing layer 127 may polarize light input to and output from the liquid crystal layer to adjust a transmittance ratio of light penetrating the liquid crystal layer, thereby implementing an image.

Specifically, light penetrating the second polarizing layer 127 may be polarized. The polarized light may penetrate the liquid crystal layer. In this instance, the liquid crystal layer is rotated a polarization axis of light polarized in accordance with an image signal. In addition, the first polarizing layer 121 may absorb the polarized light penetrating the liquid crystal layer in accordance with the rotated axis.

The display unit 120 may be accommodated in the case (or a first support unit) 110. The case 110 may accommodate both the display unit 120 and the functional panel 101. The case 110 may be placed in an upper edge region of the display unit 120. Alternatively, the case 110 may accommodate only the display unit 120, and the functional panel 101 may be supported by the display unit 120. The case 110 may be placed in a lower edge region of the display unit 120. The case 110 accommodating the display unit 120 may be assembled to the storage unit 150 accommodating the light-emitting unit 130.

The light-emitting unit 130 may be positioned below the display unit 120. The light-emitting unit 130 may include a light source 135, a light guide plate 133, and an optical sheet 131.

The light source 135 may be disposed at a side below the display unit 120. In this instance, a plurality of light emitting diodes (LEDs) may be installed as the light source 135. The light guide plate 133 may guide light from the light source 135 and supply the light to the display unit 120. The optical sheet 131 may be positioned between the display unit 120 and the light guide plate 133. In this instance, the optical sheet 131 and the display unit 120 may be positioned a certain distance away from each other. The optical sheet 131 may include a diffusion sheet and a prism sheet. However, the disclosure is not limited thereto. The optical sheet 131 may diffuse and concentrate light which is guided by the light guide plate 133 and supplied to the display unit 120.

Here, the optical sheet 131 and the light guide plate 133 may be referred to as an optical unit. In other words, the optical sheet 131 and the light guide plate 133 may supply light from the light source 135 to the display unit 120. A reflector may be disposed below the light guide plate 133. The reflector may reflect light guided to below the light guide plate 133.

The light-emitting unit 130 may be accommodated in the storage unit (or a second support unit) 150. The storage unit 150 may be positioned below the light-emitting unit 130. In other words, the storage unit 150 may support the light-emitting unit 130. The storage unit 150 may have a rear surface positioned below the reflector, and a side surface that fixes side surfaces of the light guide plate 133 and the optical sheet 131, and the light source 135. The storage unit 150 accommodating the light-emitting unit 130 may be assembled to the case 110 accommodating the display unit 120.

The optical sheet 131 and the light guide plate 133 may have protrusions 132 and 134. The protrusions 132 and 134 may be positioned at edges of the optical sheet 131 and the light guide plate 133. In addition, the protrusions 132 and 134 may be positioned at another side of the optical sheet 131 and the light guide plate 133 facing the edges. The storage unit 150 may have a protrusion 151. The protrusion 151 of the storage unit 150 may be provided to correspond with the protrusions 132 and 134 of the optical sheet 131 and the light guide plate 133.

The optical sheet 131 and the light guide plate 133 may be fastened to the storage unit 150. The protrusion 132 of the optical sheet 131, the protrusion 134 of the light guide plate 133, and the protrusion 151 of the storage unit 150 may have holes. A fastening member 161 may pass through the holes. That is, when the fastening member 161 passes through the holes, the protrusions 132 and 134 of the optical sheet 131 and the light guide plate 133 may be fastened to the storage unit 150. In this instance, the protrusion 151 of the storage unit 150 may be bent. Specifically, an external force may be applied to the fastening member 161 when the protrusions 132 and 134 of the optical sheet 131 and the light guide plate 133 are fastened to the storage unit 150. The fastening member 161 may pass through the holes of the protrusions 132, 134, and 151 using the applied external force. In this instance, the external force applied to the fastening member 161 may be delivered to the storage unit 150. Therefore, a portion around the hole of the storage unit 150 may be pressed. As a result, the protrusion 151 of the storage unit 150 may be bent.

Since the protrusion 151 of the storage unit 150 is bent, a gap may be generated between the storage unit 150 and the case 110 when the storage unit 150 and the case 110 are assembled together. In particular, the gap is easily generated around the fastening member 161. In this instance, a dual sealing tape 170 may be used to seal the gap.

The dual sealing tape (or adhesive member) 170 may bind the case 110 and the storage unit 150 together. The dual sealing tape 170 may be attached to the storage unit 150 and the case 110. Specifically, the dual sealing tape 170 may be attached to a rear surface of the protrusion 151 of the storage unit 150 corresponding to the protrusions 132 and 134 of the optical sheet 131 and the light guide plate 133, a side surface of the protrusion 151 of the storage unit 150, and a side surface of the case 110. The dual sealing tape 170 may seal the gap between the case 110 and the storage unit 150. In other words, in order to minimize a gap generated when a portion of the storage unit 150 is bent due to the fastening member 161, the dual sealing tape 170 may restore the bent portion of the storage unit 150. Here, the dual sealing tape 170 may minimize particles from entering between the display unit 120 and the optical unit by minimizing the gap between the case 110 and the storage unit 150. A principle in which the dual sealing tape 170 seals the gap between the case 110 and the storage unit 150 will be described in detail below with reference to FIG. 3.

For example, the dual sealing tape 170 may be made of polyethyleneterephthalate or one of silicone materials. However, the disclosure is not limited thereto.

Figure 3:
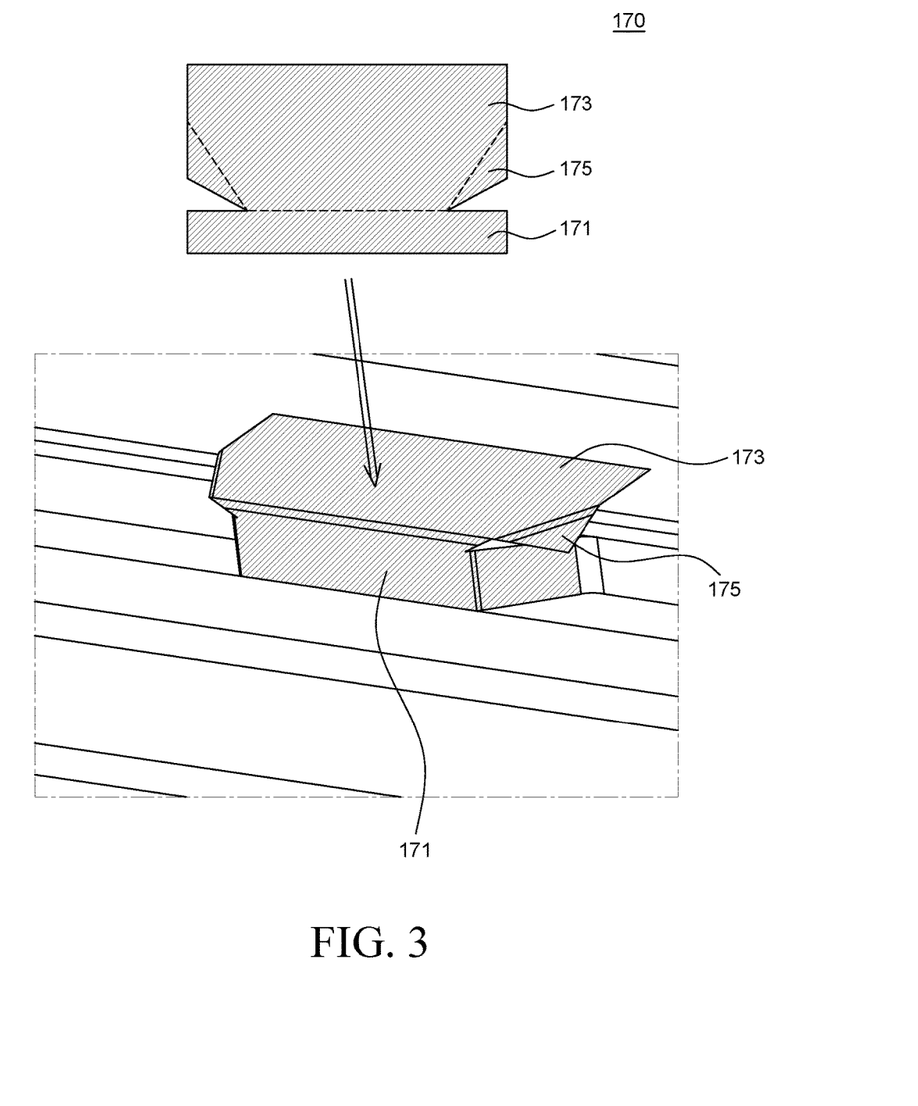
FIG. 3 is a pictorial drawing and a plan view of a dual sealing tape according to an embodiment of the present disclosure.

FIG. 3 is a pictorial drawing and a plan view of a dual sealing tape according to an embodiment of the present disclosure.

The dual sealing tape 170 may bind the case 110 and the storage unit 150. The dual sealing tape 170 may be attached to the storage unit 150 and the case 110.

The dual sealing tape 170 may have a first portion 171, a second portion 173, and a third portion 175.

The first portion 171 of the dual sealing tape 170 is a portion attached to a side surface of the case 110 and a side surface of the storage unit 150. The first portion 171 may cover a gap between the case 110 and the storage unit 150.

Specifically, when the protrusions of the optical sheet 131 and the light guide plate 133 are fastened to the storage unit 150, the first portion 171 may cover a gap between the case 110 and the storage unit 150 due to bending of the protrusion of the storage unit 150. The first portion 171 of the dual sealing tape 170 may restore the bending of protrusion to minimize the gap due to bending of the protrusion of the storage unit 150. Therefore, the first portion 171 may seal the gap between the case 110 and the storage unit 150. In other words, the first portion 171 of the dual sealing tape 170 may primarily seal the gap between the case 110 and the storage unit 150.

For example, the first portion 171 of the dual sealing tape 170 may have a rectangular shape. However, the disclosure is not limited thereto.

The second portion 173 of the dual sealing tape 170 is a portion extended from the first portion 171 of the dual sealing tape 170. The second portion 173 of the dual sealing tape 170 is a portion attached to the rear surface of the storage unit 150. Here, an area of the second portion 173 may be wider than an area of the first portion 171 of the dual sealing tape 170. Therefore, the second portion 173 may configured to improve the dual sealing tape 170 to be strongly attached to the case 110 and the storage unit 150.

Specifically, when the first portion 171 of the dual sealing tape 170 restores the bending of protrusion of the storage unit 150, the second portion 173 of the dual sealing tape 170 may be attached to the storage unit 150 to allow the first portion 171 to be strongly attached to the protrusion of the storage unit 150 without being detached therefrom.

The second portion 173 of the dual sealing tape 170 may be positioned to correspond with the protrusion of the storage unit 150. Therefore, the second portion 173 may have the same shape as that of the protrusion. For this reason, for example, the second portion 173 of the dual sealing tape 170 may have a trapezoid shape. However, the disclosure is not limited thereto.

The third portion 175 of the dual sealing tape 170 is a portion extended from the second portion 173 of the dual sealing tape 170. The third portion 175 of the dual sealing tape 170 is a portion that covers a part of the first portion 171 of the dual sealing tape 170.

Specifically, the third portion 175 of the dual sealing tape 170 may cover a part of the first portion 171 of the dual sealing tape 170 which covers the gap between the case 110 and the storage unit 150. The third portion 175 may additionally cover the gap between the case 110 and the storage unit 150 which is covered with the first portion 171. Therefore, the third portion 175 may additionally seal the gap between the case 110 and the storage unit 150. That is, the third portion 175 of the dual sealing tape 170 may secondarily seal the gap between the case 110 and the storage unit 150.

In addition, the third portion 175 of the dual sealing tape 170 may configured to improve the dual sealing tape 170 to be strongly attached to the case 110 and the storage unit 150.

Specifically, when the first portion 171 of the dual sealing tape 170 restores the bending of protrusion of the storage unit 150, the third portion 175 of the dual sealing tape 170 may be attached to the first portion 171 of the dual sealing tape 170 which is attached to the side surface of the storage unit 150 to allow the first portion 171 to be strongly attached to the side surface of the protrusion of the storage unit 150 without being detached therefrom.

For example, the third portion 175 of the dual sealing tape 170 may have a triangular shape. However, the disclosure is not limited thereto. In addition, the second portion 173 and the third portion 175 of the dual sealing tape 170 may have a trapezoid shape as a whole. However, the disclosure is not limited thereto.

The first portion 171 and the third portion 175 of the dual sealing tape 170 may seal the gap between the case 110 and the storage unit 150. That is, the first portion 171 and the third portion 175 of the dual sealing tape 170 may restore the bending of a part of the storage unit 150 to minimize a gap generated when a portion of the storage unit 150 is bent by the fastening member 161.

The dual sealing tape 170 may have a dual cover structure in which certain portions of the dual sealing tape 170 overlap each other to restore the bent protrusion of the storage unit 150. Here, the overlapping certain portions of the dual sealing tape 170 may be determined based on shapes of the storage unit 150 and the case 110 to which the dual sealing tape 170 is attached.

Therefore, it is possible to minimize particles from entering between the display unit 120 and the optical unit by minimizing the gap between the case 110 and the storage unit 150. As a result, it is possible to minimize particles from being positioned on a surface of the optical sheet 131 or between the optical sheets 131. In other words, it is possible to suppress the black dot defect which can be generated when the particles blocks light, and thus light is not supplied to a portion of the display unit 120.

In addition, it is possible to suppress damage to the optical sheet 131 due to the particles positioned on the surface of the optical sheet 131 or between the optical sheets 131. In other words, it is possible to suppress the bright dot defect which can be generated when an excessive amount of light is supplied to a portion of the display unit 120 due to damage to the optical sheet 131.

That is, the dual sealing tape 170 may suppress the black dot defect and the bright dot defect which can be generated in the liquid crystal display 100 by sealing the gap between the case 110 and the storage unit 150 to minimize particles from entering the gap.

Figure 4:
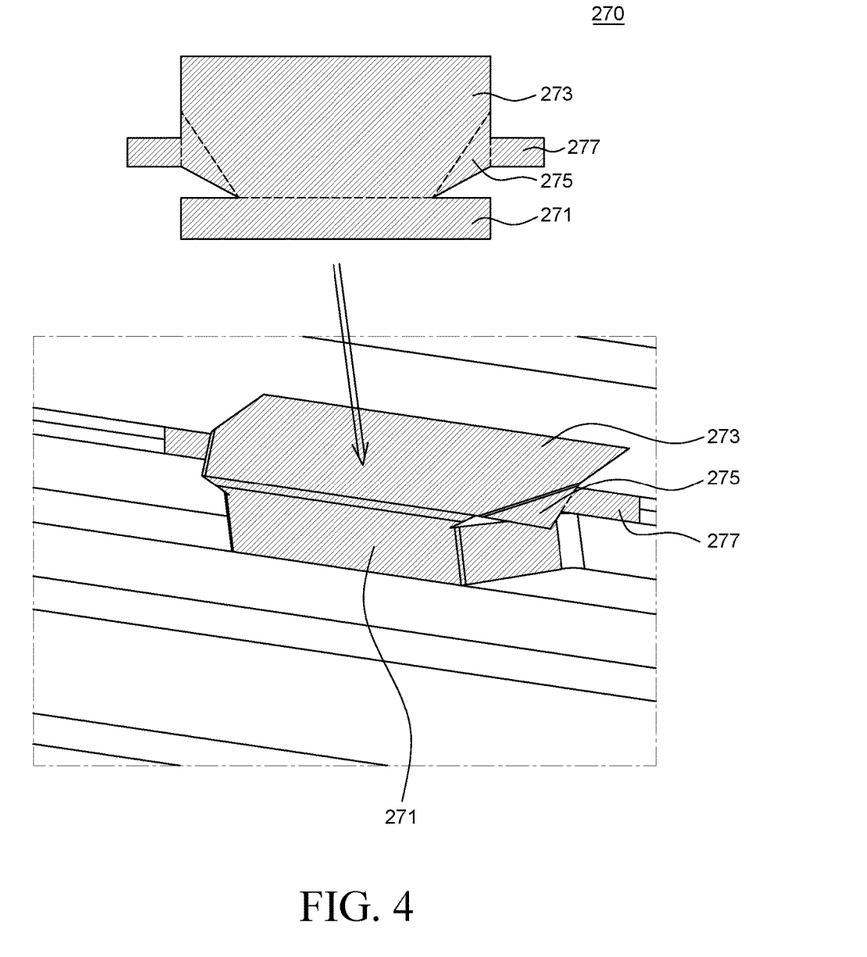
FIG. 4 is a pictorial drawing and a plan view of a dual sealing tape according to another embodiment of the present disclosure.

FIG. 4 is a pictorial drawing and a plan view of a dual sealing tape according to another embodiment of the present disclosure. When a dual sealing tape 270 of FIG. 4 is compared with the dual sealing tape 170 illustrated in FIG. 3, only a configuration of the dual sealing tape 270 is changed, and other components are substantially the same. Thus, a repeated description may be omitted or brief.

The dual sealing tape 270 may include a fourth portion 277.

The fourth portion 277 of the dual sealing tape 270 is a portion extended from a third portion 275 of the dual sealing tape 270. The fourth portion 277 of the dual sealing tape 270 is a portion attached to side surfaces of the case 110 and the storage unit 150. The fourth portion 277 of the dual sealing tape 270 may cover the gap between the case 110 and the storage unit 150.

Specifically, the fourth portion 277 of the dual sealing tape 270 may cover a side surface of the case 110 and a side surface of the storage unit 150 which are not covered by a first portion 271 and the third portion 275 of the dual sealing tape 270. In this instance, the fourth portion 277 may additionally cover the gap between the case 110 and the storage unit 150. Therefore, the fourth portion 277 may additionally seal the gap between the case 110 and the storage unit 150.

In addition, the fourth portion 277 of the dual sealing tape 270 may configured to improve the dual sealing tape 270 to be strongly attached to the case 110 and the storage unit 150.

Specifically, when the first portion 271 and the third portion 275 of the dual sealing tape 270 restores the bending of protrusion of the storage unit 150, the fourth portion 277 of the dual sealing tape 270 may be attached to the side surface of the case 110 and the side surface of the storage unit 150, to which the first portion 271 and the third portion 275 are not attached, to improve the first portion 271 and the third portion 275 to be strongly attached to the protrusion of the storage unit 150 without being detached therefrom.

That is, the fourth portion 277 of the dual sealing tape 270 may configured to improve binding and sealing of the dual sealing tape 270. Here, for example, the fourth portion 277 may have a rectangular shape. However, the disclosure is not limited thereto.

Figure 5:
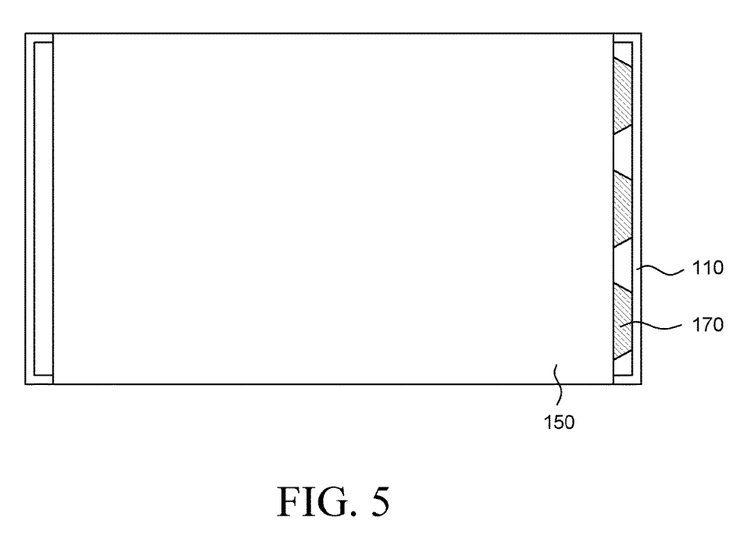
FIG. 5 is a plan view illustrating a disposition of a dual sealing tape according to an embodiment of the present disclosure.

FIG. 5 is a plan view illustrating a disposition of a dual sealing tape according to an embodiment of the present disclosure. When the dual sealing tape 170 of FIG. 5 is compared with the dual sealing tape 170 illustrated in FIG. 3, only a disposition of the dual sealing tape 170 is described in detail, and a configuration and other components of the dual sealing tape 170 are substantially the same. Thus, a repeated description may be omitted or brief.

The dual sealing tape 170 may bind the case 110 and the storage unit 150 The dual sealing tape 170 may be attached to the storage unit 150 and the case 110. Specifically, the dual sealing tape 170 may be attached to the rear surface of the protrusion of the storage unit 150 corresponding to the protrusions of the optical sheet and the light guide plate, the side surface of the protrusion of the storage unit 150, and the side surface of the case 110.

The protrusions of the optical sheet and the light guide plate may be positioned at edges of the optical sheet and the light guide plate. Further, the optical sheet and the light guide plate may have a plurality of protrusions. Therefore, the protrusion of the storage unit 150 may be positioned at an edge of the storage unit 150. Here, a plurality of protrusions may be positioned at the edge of the storage unit 150. The dual sealing tapes 170 may be attached to the protrusions positioned at the edge of the storage unit 150. That is, the dual sealing tapes 170 may be attached to rear surfaces of the protrusions positioned at the of the storage unit 150, side surfaces of the protrusions positioned at the edge of the storage unit 150, and the side surface of the case 110.

A disposition of the protrusions of the optical sheet and the light guide plate may be determined based on extension of the optical sheet and the light guide plate due to release of heat from the display panel and the light-emitting unit. The display panel and the light-emitting unit may release heat when the liquid crystal display is driven. In this instance, the optical sheet and the light guide plate may be extended due to heat released from the display panel and the light-emitting unit. Therefore, areas of the optical sheet and the light guide plate may be increased. Thus, the optical sheet and the light guide plate included in the light-emitting unit may be bent. The bended optical sheet and light guide plate may non-uniformly diffuse light from the light source. As a result, uniform light may not be supplied to the display unit. In other words, the disposition of the protrusions of the optical sheet and the light guide plate may be determined to minimize bending of the optical sheet and the light guide plate. For example, the protrusions of the optical sheet and the light guide plate may be disposed at the edges of the optical sheet and the light guide plate to ensure an area such that the optical sheet and the light guide plate may extend in a direction other than a direction toward the edges even when the areas of the optical sheet and the light guide plate increase.

Figure 6:
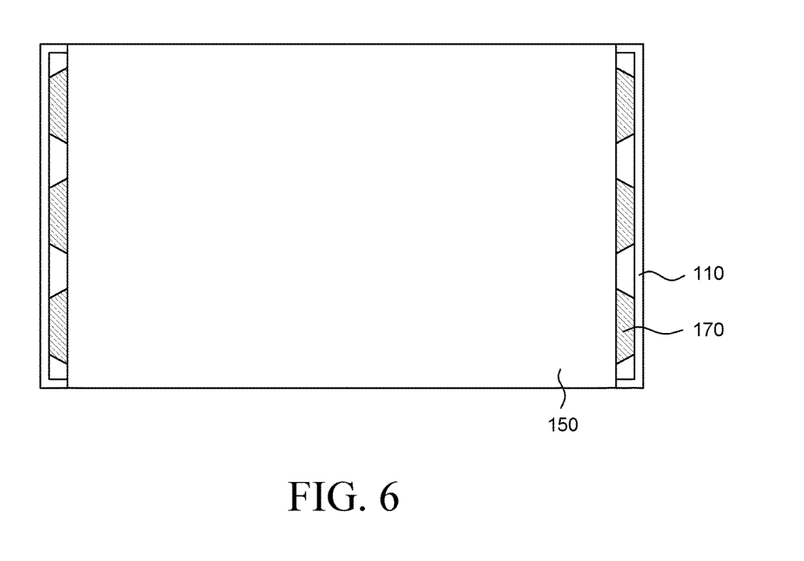
FIG. 6 is a plan view illustrating a disposition of a dual sealing tape according to another embodiment of the present disclosure.

FIG. 6 is a plan view illustrating a disposition of a dual sealing tape according to another embodiment of the present disclosure. When the dual sealing tape 170 of FIG. 6 is compared with the dual sealing tape 170 illustrated in FIG. 5, only a disposition of the dual sealing tape 170 is changed, and a configuration and other components of the dual sealing tape 170 are substantially the same. Thus, a repeated description may be omitted or brief.

In this instance, the protrusions of the optical sheet and the light guide plate may be positioned at one edge of the optical sheet and the light guide plate and other edge thereof facing the one edge. Further, the optical sheet and the light guide plate may have a plurality of protrusions. Therefore, the protrusion of the storage unit 150 may be positioned at one edge of the storage unit 150 and other edge thereof facing the one edge. Here, a plurality of protrusions may be positioned at the one edge of the storage unit 150 and the other edge thereof facing the one edge. For this reason, the dual sealing tapes 170 may be attached to the protrusions positioned at the one edge of the storage unit 150 and the other edge thereof facing the one edge. That is, the dual sealing tapes 170 may be attached to rear surfaces of the protrusions positioned at the one edge of the storage unit 150 and the other edge thereof facing the one edge, side surfaces of the protrusions, and side surfaces of the case 110.

The embodiments of the present disclosure can also be described as follows.

According to an aspect of the present disclosure, a liquid crystal display is provided. The liquid crystal display includes a display panel; a functional panel on the display panel; a first support unit configured to support the functional panel; a light-emitting unit below the display panel; a second support unit configured to support the light-emitting unit, the second support unit being attached to the first support unit; and a dual sealing tape configured to bind the first support unit and the second support unit together, and sealing a gap between the first support unit and the second support unit.

The light-emitting unit may include an optical sheet including a protrusion, and the dual sealing tape may seal a gap generated when the protrusion is fastened to the second support unit and a portion of the second support unit is bent around the protrusion.

The dual sealing tape may be configured to minimize particles from entering the gap to suppress a black dot defect or a bright dot defect.

The dual sealing tape may have a first portion attached to a side surface of the first support unit and a side surface of the second support unit and cover the gap, a second portion extended from the first portion and attached to a rear surface of the second support unit, and a third portion extended from the second portion and cover a part of the first portion.

The second portion may face the protrusion.

The dual sealing tape may have a fourth portion extended from the third portion, and the fourth portion may be attached to the side surface of the first support unit and the side surface of the second support unit, and became more binding and sealing of the dual sealing tape.

The second portion and the third portion may have a trapezoid shape as a whole.

The protrusion may be positioned at one edge of the optical sheet.

The protrusion may be positioned at the other edge of the optical sheet corresponding to the one edge of the optical sheet.

A disposition of the protrusion may be determined based on extension of the optical sheet due to release of heat from the display panel and the light-emitting unit.

The dual sealing tape may be made of polyethylene-terephthalate or one of silicone materials.

According to another aspect of the present disclosure, a liquid crystal display is provided. The liquid crystal display includes a display unit; an optical unit below the display unit; a light source configured to supply light to the display unit through the optical unit; a storage unit configured to accommodate the optical unit and the light source; a fastening member configured to fasten the optical unit to the storage unit; a case configured to accommodate the display unit, the case being bound to the storage unit; and an adhesive member configured to minimize a particles from entering between the display unit and the optical unit by minimizing a gap between the storage unit and the case.

The adhesive member may restore a bend of a portion of the storage unit so as to minimize a gap generated due to the bent portion of the storage unit.

The adhesive member may have a dual cover structure in which certain portions of the adhesive member overlap each other to restore the bend of the portion of the storage unit.

The certain portions of the adhesive member may be determined based on shapes of the storage unit and the case to which the adhesive member is attached.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display comprising:
   a display panel;
   a functional panel on the display panel;
   a first support unit configured to support the functional panel;
   a light-emitting unit below the display panel;
   a second support unit configured to support the light-emitting unit, the second support unit being assembled to the first support unit; and
   a dual sealing tape configured to bind the first support unit and the second support unit, and to seal a gap between the first support unit and the second support unit,
   wherein the dual sealing tape includes a first portion attached to a side surface of the first support unit and a side surface of the second support unit, the first portion covering the gap, a second portion extended from the first portion and attached to a rear surface of the second support unit, and a third portion extended from the second portion and covering a part of the first portion.

2. The liquid crystal display according to claim 1, wherein the light-emitting unit includes an optical sheet having a protrusion, and
   the dual sealing tape seals the gap due to a bent of a portion of the second support unit around the protrusion, when the protrusion is fastened to the second support unit.

3. The liquid crystal display according to claim 2, wherein the dual sealing tape is configured to minimize particles from entering the gap to suppress a black dot defect or a bright dot defect.

4. The liquid crystal display according to claim 2, wherein the second portion corresponds to the protrusion.

5. The liquid crystal display according to claim 2, wherein the dual sealing tape includes a fourth portion extended from the third portion, and
   the fourth portion is attached to the side surface of the first support unit and the side surface of the second support unit to improve binding and sealing of the dual sealing tape.

6. The liquid crystal display according to claim 2, wherein the second portion and the third portion have a trapezoid shape as a whole.

7. The liquid crystal display according to claim 2, wherein the protrusion is positioned at one edge of the optical sheet.

8. The liquid crystal display according to claim 7, wherein the optical sheet further includes another protrusion positioned at another edge of the optical sheet corresponding to the one edge of the optical sheet on which the protrusion is positioned.

9. The liquid crystal display according to claim 8, wherein an arrangement of the protrusion is determined based on an extension of the optical sheet due to a release of heat from the display panel and the light-emitting unit.

10. The liquid crystal display according to claim 2, wherein the dual sealing tape is made of polyethylene-terephthalate or one of silicone materials.

11. A liquid crystal display comprising:
    a display unit;
    an optical unit below the display unit;
    a light source configured to supply light to the display unit through the optical unit;
    a storage unit configured to accommodate the optical unit and the light source;
    a fastening member configured to fasten the optical unit to the storage unit;
    a case configured to accommodate the display unit and to bind to the storage unit; and
    an adhesive member configured to minimize particles from entering between the display unit and the optical unit by minimizing a gap between the storage unit and the case, wherein the adhesive member has a dual cover structure in which certain portions of the adhesive member overlap each other.

12. The liquid crystal display according to claim 11, wherein the certain portions of the adhesive member are determined based on a shape of the storage unit and a shape of the case to which the adhesive member is attached.

13. A display device comprising:
a display unit;
a case in front of the display unit and including a side surface;
a backlight unit behind the display unit and providing light thereto, the backlight unit including at least one optical sheet that has at least one extension along an edge thereof;
a storage unit behind the backlight unit, the storage unit including at least one extension along an edge thereof that respectively matches the at least one extension of the optical sheet;
a fastener, that passes through the at least one extension of the storage unit and the at least one extension of the optical sheet, to attach the optical sheet to the storage unit; and
a member having a main portion that covers an undersurface of the at least one extension of the storage unit, having an elongated portion that covers a side surface of the at least one extension of the storage unit and the side surface of the case, and having wing-like portions that cover a gap between the storage unit and the case at or near the at least one extension of the storage unit.

14. The device of claim 13, wherein the wing-like portions extend from the main portion and are configured to be folded over an edge of the at least one extension of the storage unit.

15. The device of claim 14, wherein the at least one extension of the storage unit and the at least one extension of the optical sheet respectively have a trapezoidal shape.

16. The device of claim 15, wherein the elongated portion is configured to be bent and adhered along an edge of the trapazoidal shaped the at least one extension of the storage unit and the side surface of the case corresponding to the edge of the trapezoidal shaped the at least one extension of the storage unit.

17. The device of claim 16, wherein the member is notched between the wing-like portions and the elongated portion to match the trapezoidal shaped the at least one extension of the storage unit.

* * * * *